Patented Mar. 31, 1953

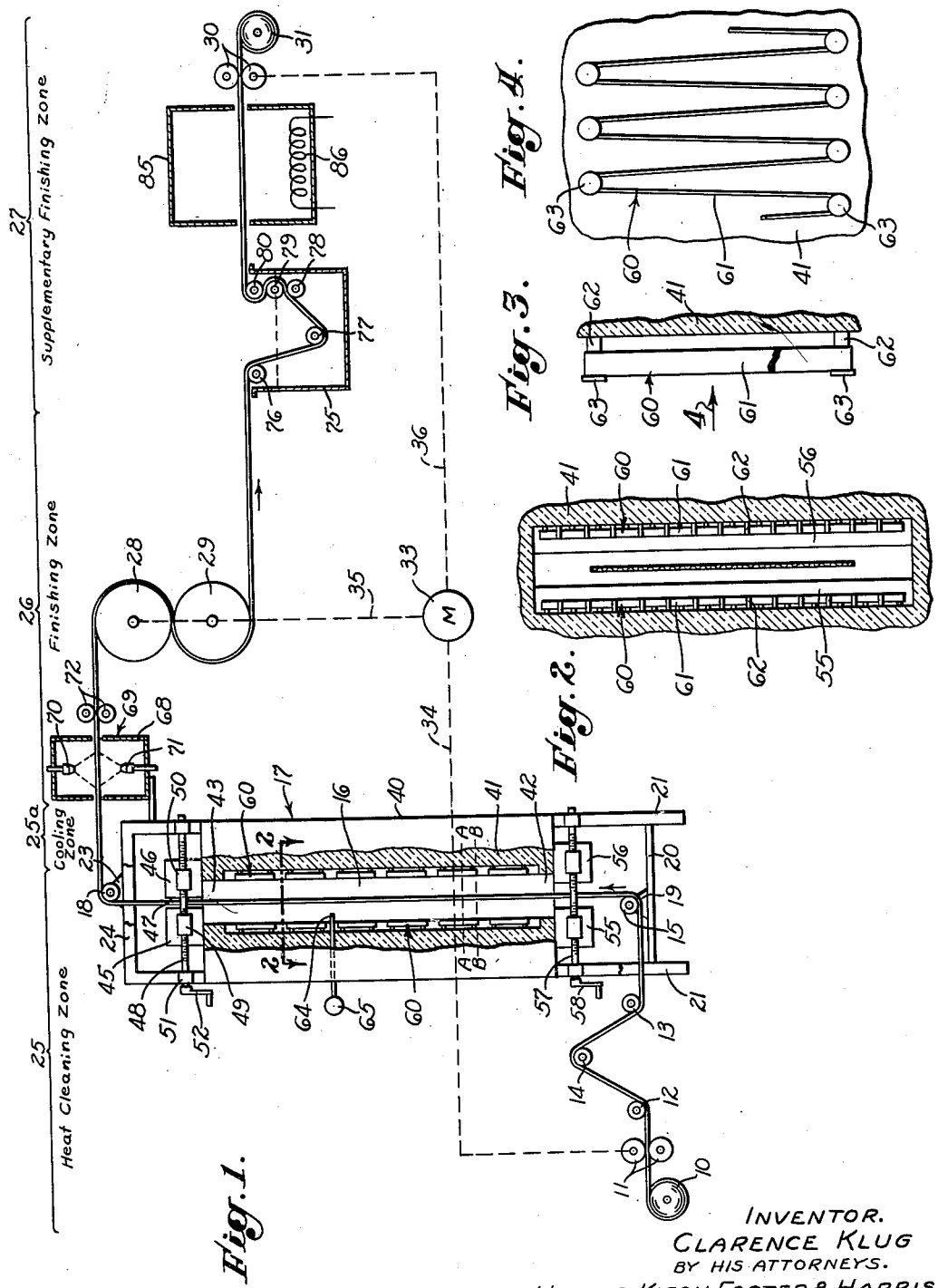

2,633,428

UNITED STATES PATENT OFFICE 2,633,428

PROCESS OF REMOVING SIZE FROM GLASS FIBERS AND THE SUBSEQUENT COATING THEREOF

Clarence Klug, Los Angeles, Calif., assignor, by mesne assignments, to Alexander H. Kerr & Company, Incorporated, Los Angeles, Calif., a corporation of Nevada Application January 22, 1949, Serial No. 72,124

13 Claims. (Cl. 117—54)

My invention relates to the continuous processing of materials and more particularly to a new process and apparatus for the continuous treatment of glass fabrics.

In the manufacture of glass fabrics, extremely small glass filaments are produced from a low alkali boro-aluminum silicate glass, these filaments being wound into strands or yarns which are then woven, knitted or otherwise entwined to form the glass fabric. Glass fabrics, as the term is herein used, applies to glass fabrics made by any such process and in which the yarns are interlaced or interlinked in a substantially definite pattern, as distinct from glass wool in which the filaments are not formed into yarns and are randomly disposed. In referring to a strip of glass fabric, I have reference to a relatively long length of such fabric, such as is produced in the usual textile mill, the glass fabric being usually rolled or bolted in the mill preparatory to being made into the ultimate manufactured products.

The glass filaments in such glass fabrics have a diameter of about .0002–.0004" and can be made by any one of several known processes. Before they are formed into strands they are coated with an organic size which serves the function of holding the filaments together in the strands and to give some degree of protection to the glass filaments during the textile operations. This organic size contains starch (often dextranized), gelatin, a complex amine and a vegetable oil, sometimes with other minor ingredients. This organic size must be removed from the textile product for specific applications and end uses and the present invention includes among its important objects a novel process and apparatus for heat-treating glass fabrics to burn this size from the fabric.

It has previously been proposed to remove the size by rolling long lengths of the glass fabric on perforated steel mandrels to produce large rolls which are then placed in a closed oven. The temperature is slowly brought up to about 500° F., in an attempt to volatilize the size, this requiring some 10–15 hours. The oven temperature is then raised to about 650–700° F., the rolls being retained in the oven for a total time of about 40–50 hours, depending upon the weight per yard of the glass fabric. If the temperature is raised too rapidly, the size will spontaneously ignite which in turn will raise the temperature inside the roll excessively, often to a temperature above the softening point of the glass with the result that the glass strands fuse together or melt and the roll is ruined. Such a batch process is expensive and unreliable and never subjects all portions of the rolled fabric to the same degree of treatment, often producing relatively large variations in strength, relaxing or setting of the yarns, color, degree of removal of the organic size, etc. along the length of the fabric when unwound.

I have found that glass fabrics can be moved relatively rapidly through an appropriate heating zone, in which there is an abundance of oxygen to support the combustion of the size, and that the glass fabric can be progressively heated in the entrance section of the heating zone to decompose and to vaporize certain constituents of the size which ignite by auto-ignition and burn as a surface flame adjacent a relatively short transverse section of the fabric. It is an object of the present invention thus to burn the size from an advancing glass fabric. Another object is to control the movement of the fabric to maintain such a surface flame in a selected zone of the furnace.

Other objects of the invention reside in the furnace construction; in controlling the tension on the glass fabric while it is subjected to high temperatures; in passing the fabric through the heating zone of the furnace without whipping and while it is disposed in a plane; etc.

It is also desirable that the glass yarns be relaxed, kinked or set in their sinuous or bent forms in which they are present in the fabric. This can be accomplished to a greatly enhanced degree by the continuous process of the present invention. This result follows from a proper control of temperature and time of treatment, including usually the step of retaining the fabric in heated condition during a period of time after the surface flame on any section of the fabric has been extinguished, as by continuing the application of heat in a zone of the furnace beyond that zone in which the surface flame exists. It is an object of the present invention to provide a process whereby the glass yarns are set to a greatly enhanced degree. In this connection, the aforesaid batch process appears commercially incapable of producing a set to a degree more than 50% of that produced by the present continuous process and usually far less than 50%.

Another object of the invention is to provide a process for the heat treatment of glass fabric in which the strength of the treated material is substantially uniform throughout the length of the fabric and in which this strength is at least 30% of the strength of the untreated fabric.

A further object of the invention is to provide a continuous process for the treatment of glass fabric by which the residue organic size can be reduced consistently to an extremely low figure. If desired, the process can reduce this residue to an immeasurably small amount up to a small fraction of 1%, typically less than about 0.2%.

Another feature of the invention is that the heat treatment of the glass fabric can be combined with subsequent treatments, examples of which are given hereinafter. It is an important object of the invention to provide a continuous process for the heat treatment and subsequent processing of glass fabrics.

By way of example, if the glass fabrics, heat treated as above, are to be used for decorative purposes or in the manufacture of silicone or other types of electrical laminates, these glass fabrics are preferably continuously treated with a silicone-type material, later described in greater detail. The resulting product has an exceptionally full "hand" and is textile-like in character. Previous glass fabrics have usually been characterized by a very poor "hand," detracting from and largely eliminating their use for draperies or other decorative purposes, albeit such use would be particularly desirable in view of the fire-proof or flame-proof character of glass fabrics. It is an important object of the present invention to provide a novel process for the treatment of glass fabrics to impart a full "hand" thereto. It is another object of the invention to provide a process for the continuous treatment of glass fabrics which can be operated to produce constancy of colors and which can produce glass fabrics of the desirable white or off-white shades.

Another subsequent treatment, which can be continuously performed following the heat treatment, is the application of an unsaturated chromium complex or an unsaturated silicone to make the fabric excellently suited for use with the low-pressure laminating resins. Laminates thus produced show high retention of strength after long immersion in water and it is an object of the invention to provide for such subsequent treatment in a continuous manner by correlating this treatment with the continuous heat treatment of the glass fabric.

Another object of the invention is the production, as an article of manufacture, of glass fabric of enhanced "hand." Another object is to provide, as an article of manufacture, a glass fabric in which the amount of residual size is less than 0.2% and preferably less than 0.1% of the weight of the glass; in which the tensile breaking strength of the glass is at least 30% of the corresponding strength of the glass before heat treatment; in which the yarns of the glass fabric have been set to an enhanced degree as compared with the aforesaid batch treatment; and in which the color is desirably in the range of whites to very light beiges or grays.

Further objects and advantages of the invention will be evident to those skilled in the art from the following description of an exemplary apparatus and an exemplary process by which the above-noted desirable results can be obtained.

Referring to the drawing:

Fig. 1 is a diagrammatic representation of certain parts of the equipment and illustrate schematically the sequence of steps which are performed while the glass fabric is moving continuously;

Fig. 2 is a horizontal sectional view through the furnace of Fig. 1, taken as indicated by the arrows 2—2 of Fig. 1;

Fig. 3 is an enlarged fragmentary view of a portion of the furnace, viewed as in Fig. 1 and showing one of the heating elements; and Fig. 4 is a fragmentary elevational view of such heating element, being taken in the direction of arrow 4 of Fig. 3.

It is usually desirable that the length of glass fabric produced in the mill be rolled on a drum or roll, rather than being fed directly into the apparatus of the invention. This is because the rate of production of the glass fabric is very limited and because the present process is capable of handling glass fabric at speeds far greater than those at which conventional textile looms can operate. Correspondingly, Fig. 1 shows the present process as starting with such a drum or roll, indicated by the numeral 10, this roll being rotatably mounted in any suitable manner in the framework of the machine.

The strip of glass fabric is fed between pay-off rolls 11 and then around tension bars or rollers 12 and 13 between which the fabric passes over a spreader bar 14 which serves to flatten the fabric and which may be an arcuate plate or a rotary structure.

The fabric then passes under a guide roll 15 and centrally upward through a heating zone 16 of an oven or furnace 17, passing then over an upper guide roll 18. The lower guide roll 15 is freely rotatable in brackets 19 carried by a shelf 20 secured to furnace-supporting legs 21. The upper guide roll 18 is freely journalled in brackets 23 mounted on an upper framework 24 of the furnace 17. The guide rolls 15 and 18 form a guide means for the glass fabric and are located at guide positions respectively beyond the ends of the heating zone.

During the movement thus far described, the fabric traverses a heat-cleaning zone 25. It subsequently passes through a cooling zone 25a, a finishing zone 26 and a supplementary finishing zone 27, through equipment which will be described in greater detail hereinafter. Suffice it to say here that, in the finishing zone, the material passes between drying rolls or drums 28 and 29 and, later, between take-up rolls 30, being then wound, as a finished glass fabric, on a roll 31.

It is important to the invention that the section of glass fabric within the heating zone 16 shall be subjected to limited tensile stress to prevent undue elongation while in heated condition. The invention contemplates that the glass fabric shall be fed to the heating zone at a controlled rate and that this fabric be withdrawn from the heating zone at an identical rate, with little tension being applied to the fabric in the heating zone because of the drive means for the fabric and with tension from this source controlled by the action of the tension bars or rollers 12 and 13 and the spreader bar 14 and the speed of the drive means. To accomplish this, Fig. 1 diagrammatically shows a variable speed motor 33 connected by any suitable gear reductions, not shown, to drive at substantially equal peripheral velocities, the pay-off rolls 11, the drums 28 and 29 and the take-up rolls 30. The operative connections from the motor are diagrammatically shown respectively by dotted lines 34, 35 and 36. If desired, the drum 31 can similarly be driven from the motor 33 through a suitable friction clutch.

In the preferred embodiment, the furnace 17 includes an outer housing 40 enclosing a mass of insulating material 41 which may be built up of bricks or masses of material capable of withstanding the high temperatures contemplated. The insulating material preferably surrounds the heating zone 16 on each of the four sides but provides entrance and exit openings 42 and 43 respectively at the lower and upper ends of the heating zone. To adjust the degree of access of these openings 42 and 43 to the surrounding atmosphere, I prefer to provide an adjustable damper means. For example, blocks of insulating material 45 and 46 are disposed to move above the upper end of the heating zone 16, being separated by a space 47 through which the glass fabric moves without touching either of the blocks. To adjust the size of the space 47, I have shown a shaft 48 with oppositely-threaded sections respectively extending through portions 49 and 50 of the two blocks. This shaft may be journalled and held against longitudinal movement by a bearing 51 connected to the upper framework 24 and may carry a handle 52 which, when turned, changes the width of the space 47.

Preferably, although not essentially, the lowermost end of the heating zone 16 is similarly partially closed by adjustable blocks 55 and 56 through the means of a double-threaded shaft 57 and a crank 58.

Suitable heating elements are disposed on opposite sides of the heating zone 16 and preferably heat this zone and the glass fabric moving therethrough primarily by radiant heat directed toward both sides of the glass fabric. As best shown in Figs. 2, 3, and 4, these heating elements are preferably of the electrical type and are indicated by the numeral 60. Each of these heating elements 60 is shown as including a Nichrome ribbon 61 wound in zig-zag fashion between ceramic posts 62 suitably imbedded in or carried by the insulating material 41 and providing heads 63 holding the ribbon in place against inward displacement. I prefer to employ a plurality of such heating units positioned one above the other on each side of the heating zone, although other arrangements can be used without departing from the spirit of the invention. Preferably, the heating unit should be relatively close to the glass fabric. In a typical large-scale installation, such as illustrated diagrammatically in Fig. 1, the distance between the heating elements may well be in the neighborhood of about 8". The width of the heating zone 16 should be sufficient to accommodate the widest glass fabric to be processed. The length or height of the heating zone will depend, in part, on the desired speed of the fabric and upon other factors to be mentioned hereinafter. In practice, I have successfully employed ovens as small as 1' in height or length up to 6' or more and even longer ovens can be used. The furnace can be used horizontally if the spacing between the guide rolls 15 and 18 is not too great so that the tension necessary to maintain the fabric in a horizontal plane will not cause permanent elongation or stretching at the temperatures employed. On the other hand, a vertically-disposed heating zone is distinctly preferable and, with such disposition, it is distinctly preferred that the glass fabric move upwardly through the heating zone rather than downwardly therethrough.

In practice, I prefer to operate each of the heating elements at substantially the same temperature but, if desired, the heating units at different elevations may be at somewhat different temperatures. There is a temperature gradient in the lower portion of the heating zone so that any section of the incoming fabric is progressively heated. During this initial heating, the volatile constituents of the organic size on the fabric are liberated. As the fabric travels into the hotter zones of the furnace, these volatile constituents ignite by auto-ignition and burn as a blue surface flame immediately adjacent the sides of the glass fabric.

One of the important concepts of the present invention is to burn the size from the glass fabric by such a surface flame. As observed in many runs, this surface flame extends over a relatively narrow horizontal band or zone. This zone is suggested in Fig. 1 as bounded by dotted lines A—A and B—B. The surface flame will appear in this zone and will extend substantially horizontally across the glass fabric. The moving fabric appears suddenly to develop this surface flame which burns until the combustion of the size is substantially complete, whereupon it is extinguished. Actually, the moving glass fabric appears to the eye to be traversing a surface-flame zone, maintained in fixed position if the process is operating correctly. If the speed of the fabric is increased, this surface-flame zone will tend to rise in position in the heating zone. If the speed of the fabric decreases, the surface-flame zone appears at a lower position. In practice, the speed of the fabric is controlled to maintain the surface-flame zone in a fixed position. In addition, it has usually been found best to maintain this surface-flame zone in the lower half of the heating zone. If the surface-flame zone is carried into the upper half of the heating zone, somewhat erratic operation may result, particularly if the surface-flame zone is near the exit opening 43.

Such a surface flame can also be obtained in a horizontal heating zone but if an upright heating zone is employed it is distinctly preferable that the movement of the fabric be upward. If the movement is downward the volatile constituent tends to be removed by the natural chimney effect and, if ignition takes place, the flame tends to travel upward to the opening 43 and extinguish itself, giving erratic and non-uniform treatment of the fabric and often producing distinct color variations along the length of the fabric.

The action played by this surface flame is not entirely understood but this type of combustion of the size undoubtedly accounts for part of the new results obtainable with the process. Actually, the amount of size to be burned is relatively small and it is believed that the heat from this combustion, while it must impart some localized heat to the glass fabric, does not play a major role in the setting of the glass yarns. The surface flames are rather shallow but appear on opposite sides of the moving fabric at substantially the same elevation in the heating zone.

There will be a chimney action in the heating zone 16, controlled in degree by the positions of the blocks 45, 46 and/or the blocks 55, 56. This action will draw fresh air continuously into the entrance opening 42 to renew or replenish the oxygen in the heating zone 16. It is essential to the invention that the oxygen content of the atmosphere in the heating zone shall be sufficient to insure the desired complete combustion of the size. In practice, the amount of oxygen in the heating zone should preferably be greatly in excess of that actually required for the burning of the size. If desired, the oxygen content of the air can be augmented by injecting oxygen into the heating zone but, in practice, I find that the chimney action of an upright furnace will draw sufficient air into the heating zone to supply the oxygen requirements. Auxiliary air or oxygen may sometimes be required in a horizontal furnace. Usually, it is preferable to space the blocks 55, 56 a wider distance than the blocks 45, 46 to control the oxygen supply and restrict the escape of the heated air from the exit opening 43. It is also desirable to avoid high air velocities in the heating zone as they tend to whip or move the glass fabric while it is exposed to glass-weakening temperatures. Preferably, the glass fabric should move smoothly through the heating zone without whipping and while in a plane determined by the surfaces of the guide rolls 15 and 18.

Vertical movement through the heating zone is also advantageous because the fabric will be kept taut by its own weight supplemented by the action of the tension bars or rollers 12 and 13 and the intervening spreader bar 14. The weight of the fabric between the guide rolls 18 and 15 should not be sufficient to elongate or distort the strands of the fabric and it is usually desirable not to employ an excessively long heating zone, particularly at high temperatures, as the tension in the fabric in the heating zone would be correspondingly increased and would be greater near the upper end of the section suspended in the heating zone. In practice, the motor 33 should not exert a tension on the fabric in the heating zone greatly above that imposed by the weight of the fabric, the tension being regulated by the elements 12, 13 and 14 to keep the fabric taut and free of whip.

For best results, the temperature of the furnace and the time of application of this temperature should be carefully correlated. The time of treatment will depend upon the length of the heating zone, e. g., its height, and the velocity of the fabric. The actions which take place in the heating zone are, in part, the result of careful correlation of these various factors.

In fact, there are two aspects of the complete heat-treating process. In the first place, the organic size must be removed. In the second place, it is very desirable that the yarns be set to an enhanced degree. The extent to which these results are interrelated is not clearly known but it is assumed that the temperature range for setting overlaps that required to effect the auto-combustion, particularly as the over-all time of heat application appears to be one factor in effecting the superior setting of the yarns.

The degree of setting is difficult to measure quantitatively, although it is a very substantial factor in bettering the "hand" of the ultimate product. Quantitative results can be obtained by treating glass tape and carefully unraveling the fill yarn from a short length of the tape, suspending this fill yarn and measuring the free hang thereof. With untreated tape, the free hang will be many times as great as with the heat-treated tape, proving the setting of the fill yarn, particularly at the edges of the tape.

It is desired that such setting be maximized and the present process has shown its distinct superiority in this regard. If the ultimate product is to have an improved "hand," the furnace temperature should be selected with this in mind. However, under no circumstances, should the furnace temperature be so high or the speed of the fabric so slow that actual bonding of the yarns at their intersections takes place.

Successful results can be obtained by employing furnace temperatures of about 1100–1400° F. Within this range, I prefer to employ temperatures of 1125–1325° F. in most operations designed to give all of the improved results hereinbefore mentioned.

The velocity of the glass fabric through the heating zone is limited only by the handling equipment, the length of the furnace and by control factors. As a practical matter, the velocity should be such that the surface-flame zone remains in constant position and preferably remains a substantial distance below the exit end of the heating zone. The velocity should never be so high that the surface flame does not form in the heating zone.

Much research on the present process has shown that the best products are produced by correlation of the length of the pass through the heating zone, the time in the heating zone, the temperature in the heating zone (e. g., as measured about two-thirds the way up, as by a thermocouple 64 connected to a meter 65) and the per cent residue of organic material (by weight, based on the weight of the glass), this correlation being substantially within the confines of the following equation:

$$r = \frac{8.57 - .0227t + .0000116t^2}{\frac{L}{T} - 85.88 + .1533t - .0000932t^2}$$

where:

$r$ = per cent residue, by weight = about 0.0–0.2%
$t$ = temperature °F. = about 1100–1400° F.
$T$ = time in minutes within a range in which exemplary and end values are as follows:
    At about 1100° F., $T$ = about .0584–10 min.
    At about 1200° F., $T$ = about .0383–3.33 min.
    At about 1300° F., $T$ = about .0283–1.67 min.
    At about 1400° F., $T$ = about .0208–1.0 min.
$L$ = length of pass of fabric through heating zone, in feet.

$T$, $L$ and $t$ should be sufficiently small to prevent physical heat-bonding of the glass threads at their points of crossing in the fabric.

Performance of the process in accordance with such equation will be found to give satisfactory results. In the preferred practice, I prefer to limit the operation to the above equation, with the additional qualification that the slope, derived by differentiating the equation, shall be less than .02.

No simple statement of time and temperature of treatment can bring in all of the factors involved, in view of the complexity of the interrelationships of the numerous variables. However, the later-presented specific examples will serve as a guide to indicate operations with a typical furnace.

A time-temperature relationship exists in the continuous heat processing of the glass fabric. In order to obtain fabrics of like treatment, of equivalent ignition loss content, or of equal breaking strength, or of equal relaxation or annealing of fibers, the time of immersion or passage through the oven decreases as the temperature is increased, in the range of temperatures of 1100°–1400° F. For example, in order to obtain fabrics equivalent in per cent ignition loss, in an oven of unit length, the time of passage through the oven at the temperature involved would vary approximately as follows:

| Temperature in °F. | Time in Seconds |
|---|---|
| 1,125 | 17–20 |
| 1,150 | 8.5–10 |
| 1,175 | 6.0–7.5 |
| 1,200 | 4.5–5.5 |
| 1,250 | 3.0–3.5 |
| 1,300 | 2.0–2.4 |
| 1,325 | 1.87–1.95 |
| 1,350 | 1.60–1.66 |

Another way of stating the relationship would be to show the increase in velocity through an oven of unit length at increasing temperatures to obtain fabrics of approximately equivalent breaking strength. A typical relationship is as follows:

| Approximate Velocity in Ft. Per Min. | Temp. in °F. |
|---|---|
| 9 | 1,200 |
| 11 | 1,250 |
| 14 | 1,300 |
| 17 | 1,350 |

The heat-treated glass fabric issues from the heating zone at a high temperature but cools rapidly in the cooling zone 25a representing, for example, the path of travel of the fabric through the air up to the time of coating in the finishing zone 26.

In the finishing zone, it is desirable to coat the fabric with a silicone or other liquid substance. This is shown as being accomplished by moving the fabric through a housing 68 of a coating means 69. This coating means may spray the silicone or other liquid substance on opposite sides of the moving fabric by use of suitable spray nozzles 70 and 71, the fabric being guided in its movement by rollers 72 before passing around the drying rolls or drums 28 and 29. Alternatively, the coating may be applied by a dip tank, e. g., of the type to be hereinafter described.

It is desirable that the glass fabric be cooled to some extent before the coating is applied and this is accomplished during passage of the fabric through the cooling zone 25a. However, it is desirable that the coating be applied while the fabric is still at superatmospheric temperature and preferably while the fabric is above the boiling point of water. As the hot fabric is cooled, there is a marked tendency for adsorption of atmospheric water on the glass surface which tends to hasten attrition. The degree or amount of adsorption increases with decreasing temperature, and reaches a maximum amount at or near room temperature, the adsorption being particularly pronounced at temperatures below the boiling point of water. For this reason, it is desirable that the coating means 69 be relatively close to the exit end of the furnace 17 so that the coating material can be sprayed or otherwise applied to the glass fabric while still at considerably elevated temperatures. This relationship is also desirable as hastening the subsequent drying and as requiring less external heat in the later drying step. In addition, the proximity of the coating means and the furnace minimizes handling operations. It is often important not to flex the fabric any more than necessary before the silicone coating is applied.

The silicone may be any of the numerous silicones known in the art and may be applied as a solution or emulsion, aqueous emulsions being preferred. I may use any silicone containing alkyl, aryl, or any organic radical, in the form of fluids, oils, gels, rubbers or even resins. Methyl silicone is preferred, applied in a 0.5–10% emulsion, approximately a 5% emulsion being preferred.

I have found that this silicone treatment gives additional softness or "hand" or drapability to the fabric, also that it gives additional protection against self-attrition and external abrasion. It makes the fabric water repellent, a very desirable factor in bettering the washability and preventing actual contact between the glass and water which would increase the abrasion between filaments or strands.

The amount of silicone emulsion thus applied, is not critical but it is usually best to apply an amount substantially equal to the weight of the glass fabric.

In the subsequent drying step, the coated fabric is dried and heated to such a temperature that the silicone reacts with the glass surface, e. g., to a temperature of about 450–700° F. The test for adequacy of this treatment is merely to check the water repellency of the glass fabric. If the treatment has been adequately performed, water will not wet the fabric.

As a part of the process, it has unexpectedly been found that any colors in the heat treated fabric can be lightened by washing the fabric, without destroying its water repellency. For example, the silicone-treated fabric can be washed in the supplementary finishing zone 27 by use of regular textile washing equipment. Even if the silicone-coated fabric is washed with a sulfonated detergent and bleached with hypochlorite, the product being then rinsed and dried, it will not lose its water repellency. This treatment is particularly desirable if light shades or an off-white fabric is produced and it is desired that the product be almost snow-white in color.

The coating means 69 can also be employed to apply other liquid coatings. For example, an unsaturated chromium complex or an unsaturated silicone can be applied in the housing 68, either by dipping or spraying, the fabric then being dried and cured at a temperature not to exceed 400° F. Such a fabric is eminently suitable for use as a reinforcement for low pressure laminating resins, as previously discussed.

Instead of drying the fabric on the rolls or drums 28 and 29, the drying can be effected in a suitable oven, particularly if the coating-material has a solvent base.

In the supplementary finishing zone 27, numerous additional operations can be performed. For example, the previously mentioned drying and bleaching steps can be applied in this zone or various other coatings can be applied. In the illustrated equipment, the fabric is fed to a dip tank 75, the fabric being guided by suitable rolls 76, 77, 78, 79, and 80.

The fabric continuously issuing from the dip tank 75 is preferably dried in any suitable manner. As shown, the fabric moves through a drying oven 85 to which heat is applied in any suitable way, as by an electric heating unit 86. The fabric then moves between the previously-described take-up rolls 30 preparatory to being wound on the roll 31.

The continuity of the process, from heat treatment through any or all of the later steps, is particularly desirable not only from the standpoint of quickness of operation but also because handling is minimized and collection of extraneous matter on and damage to the fabric between the steps is minimized.

The following examples will serve to illustrate typical modes of operation:

*Example 1*

A roll of glass cloth, made by one manufacturer, Style 162—44" wide (the specifications on this cloth are .015" thick, an average weight of 12.2 ounces per square yard, square or plain weave, made with 225-2/5 yarns in a weave construction of 28 counts in the warp by 16 in the fill) was run through a 6' vertical heat-treating oven at the rate of 15 feet a minute and at 1200° F. The material as it left the oven was white in color and had a volatile content or ignition loss of .06%. After the silicone treatment, the cloth was vastly improved in "hand" and had a breaking strength of 65% of the original fabric.

*Example 2*

A roll of fabric, made by one manufacturer, Style 138—38" wide (the specifications are .007" thick, average weight of 6.7 ounces per square yard, crowfoot weave, made with 450-2/2 yarns in a construction of 64 counts in the warp by 60 in the fill) was processed through a heat-treating oven of 6' vertical height at the rate of 35 feet per minute at a temperature of 1220° F. The fabric as it left the oven was white in color. The volatile residue content of the fabric prior to the silicone treatment was .065%. The breaking strength of the fabric was between 60 and 70% of its original strength. After the silicone treatment the cloth was vastly improved in "hand" and had good draping and non-wrinkling characteristics.

*Example 3*

A roll of fabric, made by a second manufacturer, Style 128—38" wide (the specifications on this cloth are .007" thick, an average weight of 6 ounces per square yard, square or plain weave, made with 225-1/3 yarns in a construction of 42 counts in the warp by 32 in the fill) was processed through a heat-treating oven 6' high, at the rate of 8 feet a minute and at a temperature of 1200° F. The fabric as it left the oven was light beige in color. This color was reduced to a white, after the silicone treatment was applied, by washing with an alkyl aryl sulfonate solution and bleaching with hypochlorite. The resultant product was white in color and was greatly improved in "hand."

*Example 4*

A roll of fabric of square or plain weave and .005" thick was processed through an oven 1' in length. The oven temperature was maintained at 1175° F. and the fabric was processed at a speed of 7 feet a minute. The processed material was white in color and the per cent residue was 0.1. The fabric had a strength equal to 60% of the original strength.

It is recognized that various changes and modifications will be apparent to those skilled in the art and need not be here enumerated in detail. Such changes and modifications can be made without departing from the spirit of the invention.

The apparatus herein disclosed is claimed in my co-pending divisional application Serial No. 134,717, filed December 23, 1949.

I claim as my invention:

1. A process for burning an organic size from a glass fabric comprising interlaced yarns formed of glass filaments, which process includes the steps of: continuously and progressively moving said glass fabric through a zone containing an atmosphere having an excess of oxygen over and above that required for complete combustion of said organic size; heating said atmosphere and the glass fabric moving therethrough by applying heat to said atmosphere and to said fabric while in said zone to heat said fabric progressively until combustion of said organic size takes place, said combustion forming a surface flame in a band transverse to the direction of movement of said glass fabric, said combustion tending to deplete the oxygen in said atmosphere; maintaining the speed of said fabric at a value to retain the surface-flame band in a substantially fixed position in said zone; and continuously renewing the oxygen content of said atmosphere in said zone.

2. A process for burning an organic size from a glass fabric comprising interlaced yarns formed of glass filaments, which process includes the steps of: continuously and smoothly moving said glass fabric through a zone containing an atmosphere having an excess of oxygen over and above that amount of oxygen required for complete combustion of said organic size; heating said atmosphere and the glass fabric moving therethrough to heat said fabric progressively until volatile products are released from said size to ignite and burn as a surface flame in a band transverse to the direction of movement of said fabric through said zone, said surface flame being immediately adjacent said fabric; and maintaining the speed of said fabric at a value to retain the surface-flame band in a substantially fixed position in said zone.

3. A process as defined in claim 2, in which the speed of said fabric is maintained to retain the surface-flame band at a position substantially within the first half of the length of said zone measured parallel to the direction of movement of said fabric therethrough.

4. A process as defined in claim 2, in which said atmosphere and said glass fabric are heated by radiating heat to said fabric from both sides of said zone and toward the opposed faces of the fabric moving therethrough.

5. A process as defined in claim 2 involving the use of heating elements on opposite sides of said zone and spaced from each other a distance substantially greater than the thickness of said glass fabric to bound said zone, and in which said heating step is performed by heating said elements to a heat-radiating temperature to radiate heat to the opposed faces of the moving glass fabric.

6. A process as defined in claim 2, in which said zone is an upright elongated zone having entrance and exit openings at its opposed ends, and including the step of guiding said fabric to move longitudinally through said zone while in a substantially planar configuration.

7. A process as defined in claim 6, in which said entrance and exit openings are respectively adjacent the lower and upper ends of said elongated zone and including the step of moving said glass fabric upwardly through said entrance opening, thence longitudinally through said zone and thence from said exit opening.

8. A process for the continuous heat treatment of a glass fabric comprising interlaced yarns formed of glass filaments coated with an organic size, said process including the steps of: continuously and progressively moving said glass fabric through an upright zone having openings at its upper and lower ends; heating that portion of said glass fabric within said upright zone to a size-burning temperature to burn said size from said fabric, said heating tending to establish a thermal flow of air upwardly through said zone; maintaining the speed of the glass fabric at a value to maintain the zone of burning at a substantially fixed position in said upright zone; and throttling the flow of air from the upper of said openings.

9. A process for the continuous heat treatment of a glass fabric comprising interlaced yarns formed of glass filaments coated with an organic size, said process including the steps of: continuously and progressively moving said fabric through an upright zone communicating with the atmosphere at its upper and lower ends by moving said glass fabric into one of said ends at a given rate while drawing said glass fabric from the other of said ends at exactly the same rate and maintaining the fabric in the zone under light tension, said zone containing an air atmosphere through which the fabric moves; applying heat to said atmosphere and to the fabric moving therethrough to bring said fabric to a size-burning temperature to burn the size from the fabric, the small tension on said fabric being insufficient to cause elongation thereof while at elevated temperature in said upright zone; maintaining the speed of the glass fabric at a value to maintain the zone of burning at a substantially fixed position in said upright zone; and cooling said glass fabric upon withdrawal from said zone.

10. A continuous process for the heat treating of a glass fabric comprising interlaced yarns formed of glass filaments coated with an organic size to remove said size and set said yarns in the configuration in which they are present in the fabric, said process including the steps of: continuously moving said fabric through an elongated heating zone; applying heat to said fabric throughout the elongated heating zone while said fabric is in contact with an air atmosphere in said zone; and controlling the speed of said fabric to maintain any section thereof in said zone for a sufficient time to effect said setting of said yarns, the temperature in a portion of said zone being sufficient to effect autoignition of said size, the temperature in said zone being between about 1100° F. and 1400° F.

11. A process for continuously heat treating a glass fabric to burn therefrom an organic size and leave no more than a small residue thereof on the glass while preventing physical heat bonding of the glass threads at their points of crossing in the fabric, which process includes the steps of: continuously moving said glass fabric into, through and from a heating zone to heat treat the fabric; and controlling the time and temperature of such heat treatment within limits expressed by the equation $$r = \frac{8.57 - .0227t + .0000116t^2}{\frac{L}{T} - 85.88 + .1533t - .0000932t^2}$$

where
$r$=percent residue, by weight=about 0.0–0.2%
$t$=temp. °F.=about 1100–1400° F.
$T$=time in minutes within a range in which exemplary and end values are as follows:

At about 1100° F., T=about .0584–10 min.
At about 1200° F., T=about .0383–3.33 min.
At about 1300° F., T=about .0283–1.67 min.
At about 1400° F., T=about .0208–1.0 min.

$L$=length of pass of fabric through heating zone, in feet.

12. A process as defined in claim 11, in which the heat treatment is further controlled within a boundary determined by the slope of said equation being less than .02, the slope being derived by differentiating said equation.

13. A continuous process for the treatment of glass fabrics comprising interlaced yarns formed of glass filaments coated with an organic size, said process including the steps of: continuously and sequentially moving the glass fabric through a heating zone, a cooling zone and a finishing zone; applying heat to said glass fabric in said heating zone to bring same to a size-burning temperature to burn said organic size from said fabric, the speed of the glass fabric being such as to maintain the zone of burning at a substantially fixed position in said heating zone, the heated fabric being cooled in said cooling zone, said cooling being sufficient only to cool the fabric to a temperature substantially above room temperature; applying a coating of a liquid silicone to said glass fabric during its continuous passage through said finishing zone, said coating being applied while said fabric is at such temperature substantially above room temperature and thus minimizing the amount of water tending to adsorb on the glass fabric before application of said silicone coating; and continuously drying the silicone coating on the fabric by heating the fabric to a temperature of about 450–700° F.

CLARENCE KLUG.

REFERENCES CITED

The following references are of record in the file of this patent:

UNITED STATES PATENTS

| Number | Name | Date |
|---|---|---|
| 1,081,950 | Eller | Dec. 23, 1913 |
| 2,272,776 | Pennel | Feb. 10, 1942 |
| 2,306,222 | Patnode | Dec. 22, 1942 |
| 2,409,431 | Hess | Oct. 15, 1946 |
| 2,436,304 | Johannson | Feb. 17, 1948 |
| 2,461,841 | Nordberg | Feb. 15, 1949 |
| 2,462,202 | Kniveton | Feb. 22, 1949 |
| 2,491,828 | Otis | Dec. 20, 1949 |
| 2,518,997 | Powers | Aug. 15, 1950 |

FOREIGN PATENTS

| Number | Country | Date |
|---|---|---|
| 292,690 | Great Britain | June 25, 1928 |